US005685676A

United States Patent [19]

Johnson

[11] Patent Number: 5,685,676

[45] Date of Patent: Nov. 11, 1997

[54] ROUTER CARRIAGE ATTACHMENT

[76] Inventor: Joe C. Johnson, Box 37, Mtn. Park, N. Mex. 88325

[21] Appl. No.: 382,907

[22] Filed: Feb. 3, 1995

Related U.S. Application Data

[63] Continuation-in-part of Ser. No. 944,999, Sep. 15, 1992, abandoned.

[51] Int. Cl.[6] .................................. B23C 1/20; B27C 5/10

[52] U.S. Cl. ....................... 409/182; 144/136.95; 409/175

[58] Field of Search ........................... 144/134 D, 136 C, 144/134 R, 136.95, 154.5; 409/175, 182, 181, 179, 180

[56] References Cited

U.S. PATENT DOCUMENTS

| | | | |
|---|---|---|---|
| 2,799,305 | 7/1957 | Groean | 144/134 R X |
| 4,102,370 | 7/1978 | Vess | 144/134 D |
| 5,025,841 | 6/1991 | Totten | 144/134 R |
| 5,062,460 | 11/1991 | Deline | 144/136 C |
| 5,080,152 | 1/1992 | Collins et al. | 409/182 X |
| 5,139,065 | 8/1992 | Stark | 144/134 R X |
| 5,183,373 | 2/1993 | Floyd, Jr. | 409/179 |
| 5,289,861 | 3/1994 | Hedrick | 144/134 A |
| 5,398,740 | 3/1995 | Miller | 144/134 A X |
| 5,452,751 | 9/1995 | Engler, III et al. | 409/175 |

*Primary Examiner*—William R. Briggs

[57] ABSTRACT

An accessory carriage unit attachment for electric router, composed of one main elemental component: the slab carriage unit securable to the router at a perpenduclar angle to the major guide side surface, with attachable plastic means for greater slidable movement, with optional; legs, work stock/piece guide fence, and handle for more versatility, hence a mounting platform that need not be removed, thus facilitating most operations of a router, in portable or table router configuration.

6 Claims, 5 Drawing Sheets

ROUTER CARRIAGE ATTACHMENT

This is a continuation-in-part of application Ser. No. 07/944,999 Filing Date Sep. 15, 1992 now abandoned.

BACKGROUND OF INVENTION

This invention pertains in general to the art of hand tools and more particularly as a novel accessory tool for an electric router. An attachment so designed and built so that the electric router will more precisely maintain it's stability and perform a more flawless cut, allowing the operator more precise control of the tool.

Routers as they are now supplied, have a propensity to "teeter" on the work piece, sense less than half of the router's base can be used in juggling it's continuity of travel. This has become more the problem, with the advent of larger and more powerful models, turning even larger diameter bits, crowding the center of gravity even further of the work piece.

This invention provides the means by which a more controlled stability, with improved hand leverage, acting on the router's vertical axis, can be maintained.

Another problem associated with the router's working, is the chattering of the bit along the cutting surface.

This invention also mitigates this associated characteristic in it's further support of the router on it's horizontal axis, helping to diminish the router base's "scooting".

SUMMARY

In general the purpose of this invention, in or out of the shop setting, is to provide a means for the hand or stationary operation of an electric router (router defined as any implement power source with sufficient modem to secure a cutting device, thus becoming a router in effect, can be mounted to the invention, in order to become an effectual tool unit, hence power tool.) to incorporate into a unit a more easily ascertainable cut in both the accuracy for jointing work and the aesthetically pleasing precision of the finished molding cut, and to provided a continuing platform for the versatile all around performance of the router, without the necessity of constantly disconnecting the attachment—invention.

Another objective of this invention is to provide a greater distance of usage and a more sure avenue for a fence attachment.

Another objective of this invention is to provide for the multiple attachment configuration of two or more work stock/piece guide fences, simultaneously clamped to the parallel sides anywhere along said sides of the carriage unit.

Another objective of this invention is to provide a ridged enough frame work for a quick and reliable conversion to a "table router" within the same unit context.

Another objective of this invention is and implement that affords the operator, for practical and multiple use purposes, the means of placement, of the router or routers in several different locations on the carriage unit, particularly in regards to the use "set up" of multiple fences and routers.

A related objective of this invention is to provide to the operator, a means of discerning the placement of the work piece beneath the tool attachment.

A related objective of this invention is in providing to the operator of the larger routers, an attachment that makes the router easier to handle.

Other advantages and objectives will become apparent in the perusal of the following drawings and specifications.

BRIEF DESCRIPTION OF THE DRAWINGS

The drawings shown are for the preferred embodiment.

DETAILED DESCRIPTION OF THE PREFERRED EMBODIMENT

In accordance with the invention the tool attachment is composed of one basic element, with the responsibility for establishing the integrity of the unit as a whole, in harmony with the other means and or optional attachments to it.

The basic carriage unit with the incorporated slide enhancing quality of a plastic base secured (but removable), in conjunction with applying additional handle and adjustable work piece guide fence, produce enhanced overall control and dexterous use of the router.

Figure 1:
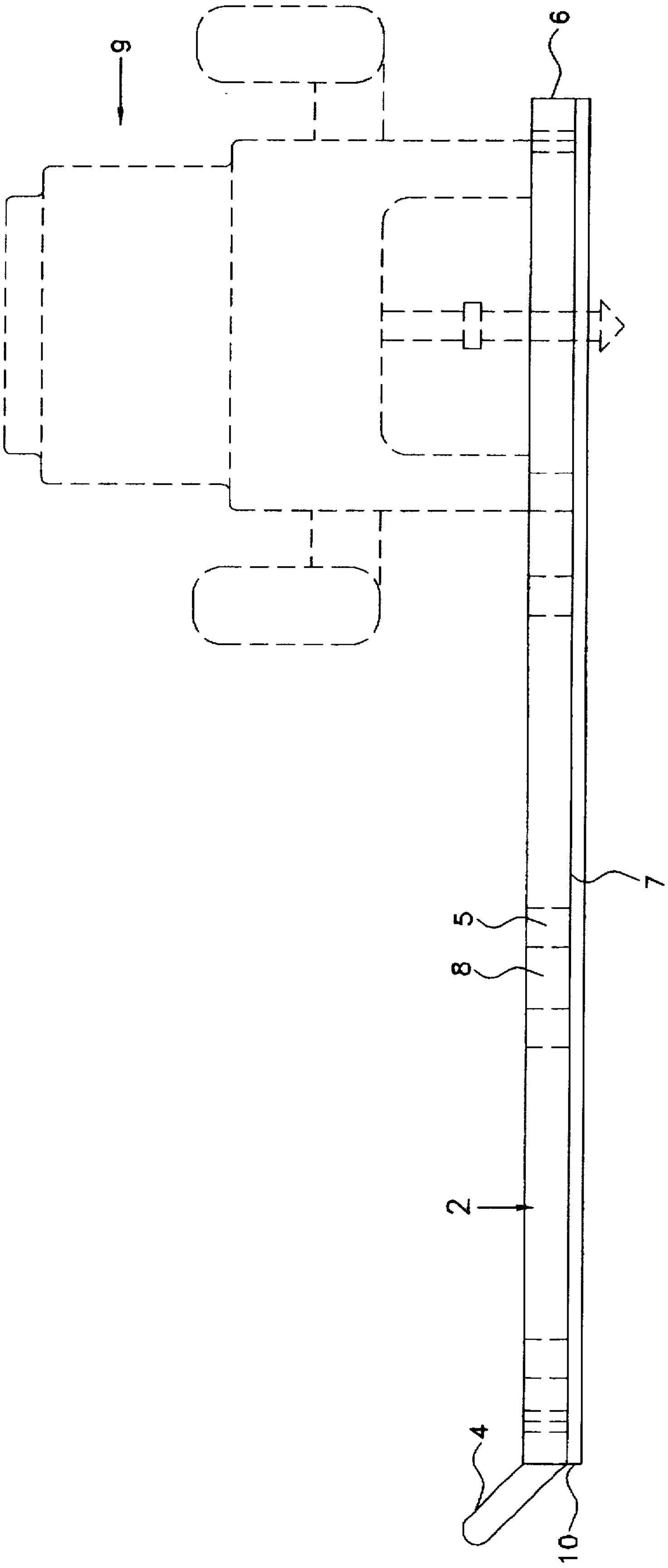
FIG. 1 is side view, showing item 1, the carriage with it's major guide side having attached,the glide facilitating (plastic) base means, and the handle means attached to it's left end. Broken lines indicate attachment of any kind of router means.
Figure 2:
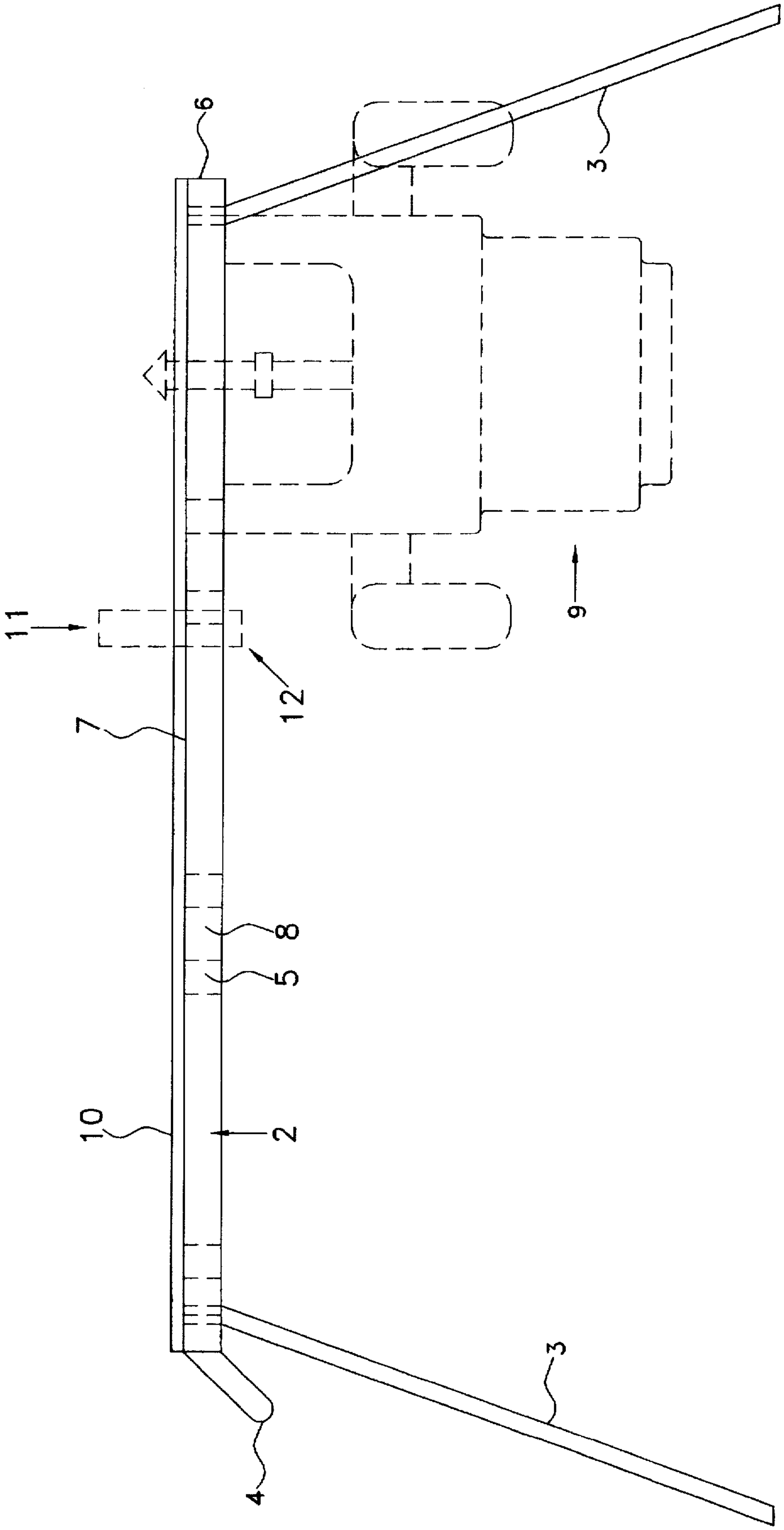
FIG. 2 is same side view as FIG. 1, but inverted with leg means attached, thus in a table router configuration. Broken lines in the form of rectangle, indicates a purposed guide fence's alignment.
Figure 3:
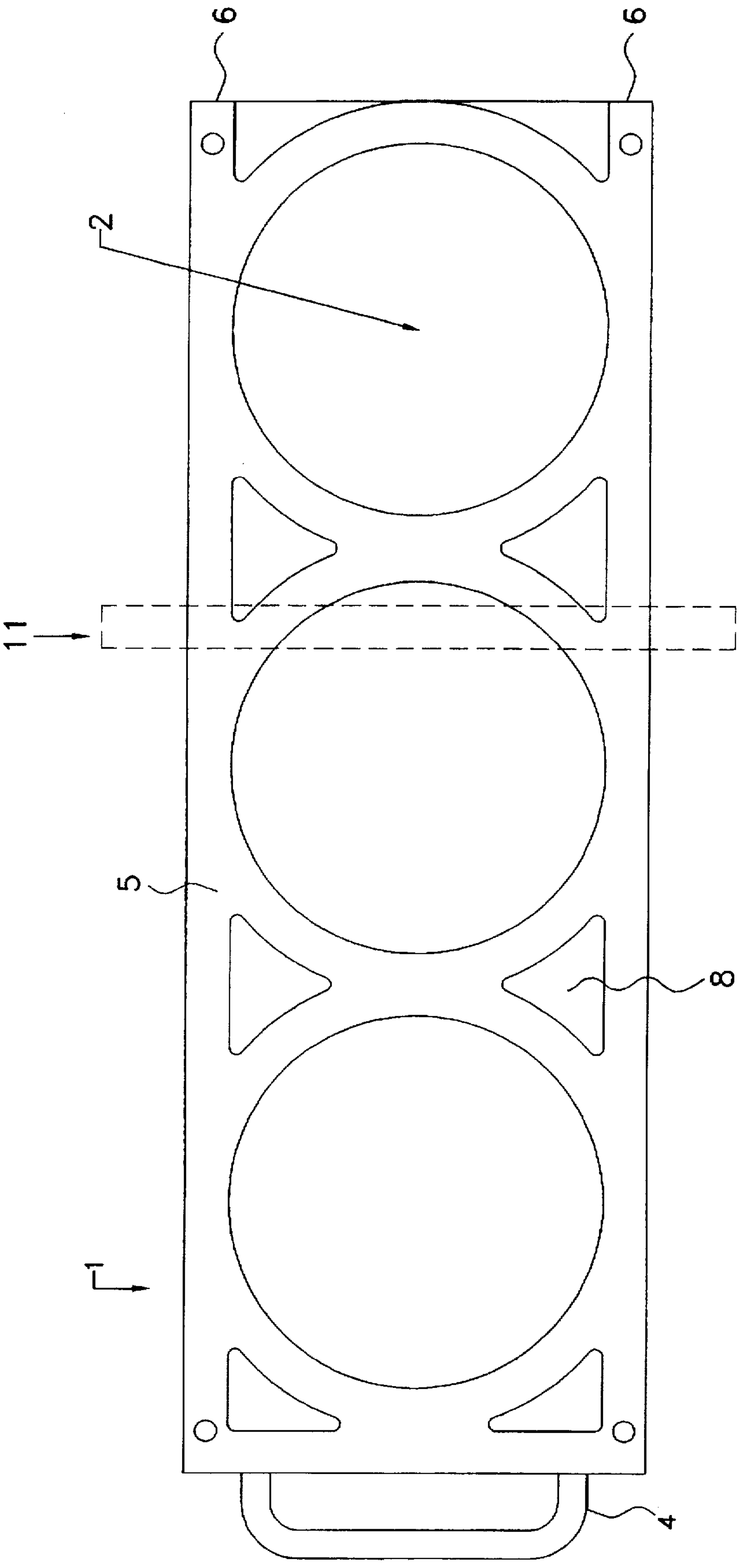
FIG. 3 is top view, showing carriage item 1, with broken lines showing the approximate deportment of suggested guide fence. Smaller circles near each of the corners indicate area of leg means attachment.
Figure 4:
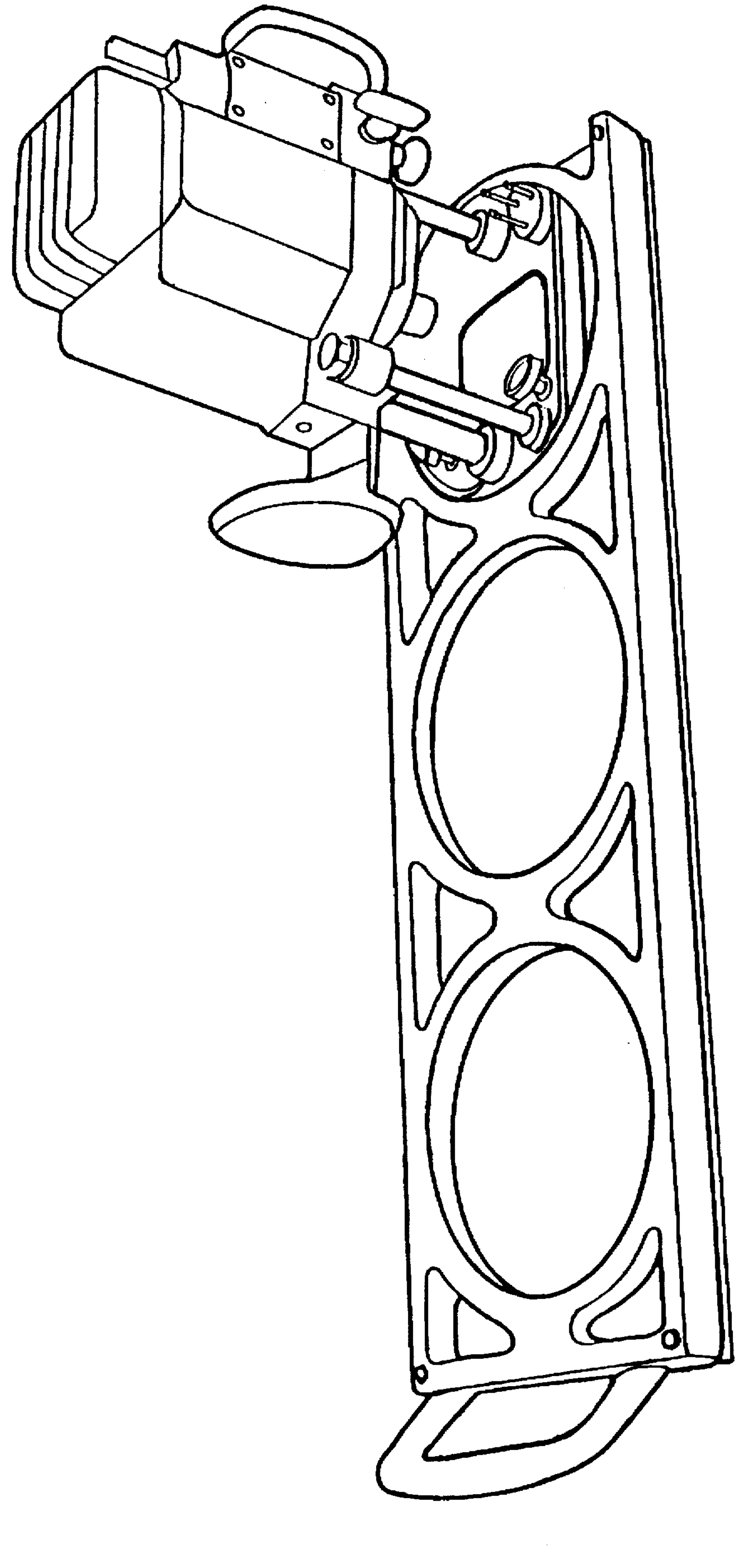
FIG. 4 is artist concept view showing router mounted onto the invention.

As shown in FIGS. 1, 2, 3, and 5 the router Carriage 1 (as here after referred to in it's composite state with it's option or optional means attached), is comprised of it's basic element, the elongated rigid rectangular frame element, it's "back bone", into which the router fits and is secured, and, onto which all other means and options secure themselves for the overall performance of the attachment. The carriage 1 as shown in FIGS. 3 & 4 is comprised of an elongated rigid rectangular frame 5 having two parallel sides 6 which form rails. The rails 6 are constructed in a manner as to permit attachment of work piece guide fence or fences. The carriage 1 includes opening 2 therein, for example 3 openings of varying sizes and shapes to accommodate differently configured base plates of routers. Various modifications to the shapes and sizes of the openings maybe made without departing from the scope of the invention. The rails 6 of carriage 1 also function as guide means.

The carriage's 1 bottom surface 7 establishes a major guide side, which is the base platform for the work piece to abut up against as the router does it's work.

The preferred overall dimensions of carriage 1's elongated rigid rectangular frame element, are ¾ of an inch in thickness, by 8 inches in width, by 24 inches in it's length. Preferably constructed of aluminum metal, cast or machined from flat stock.

As shown in FIGS. 3 & 4, there are shown hollow places 8 fashioned in such a way as to lend the greatest strength while affording the lightest possible weight.

Figure 5:
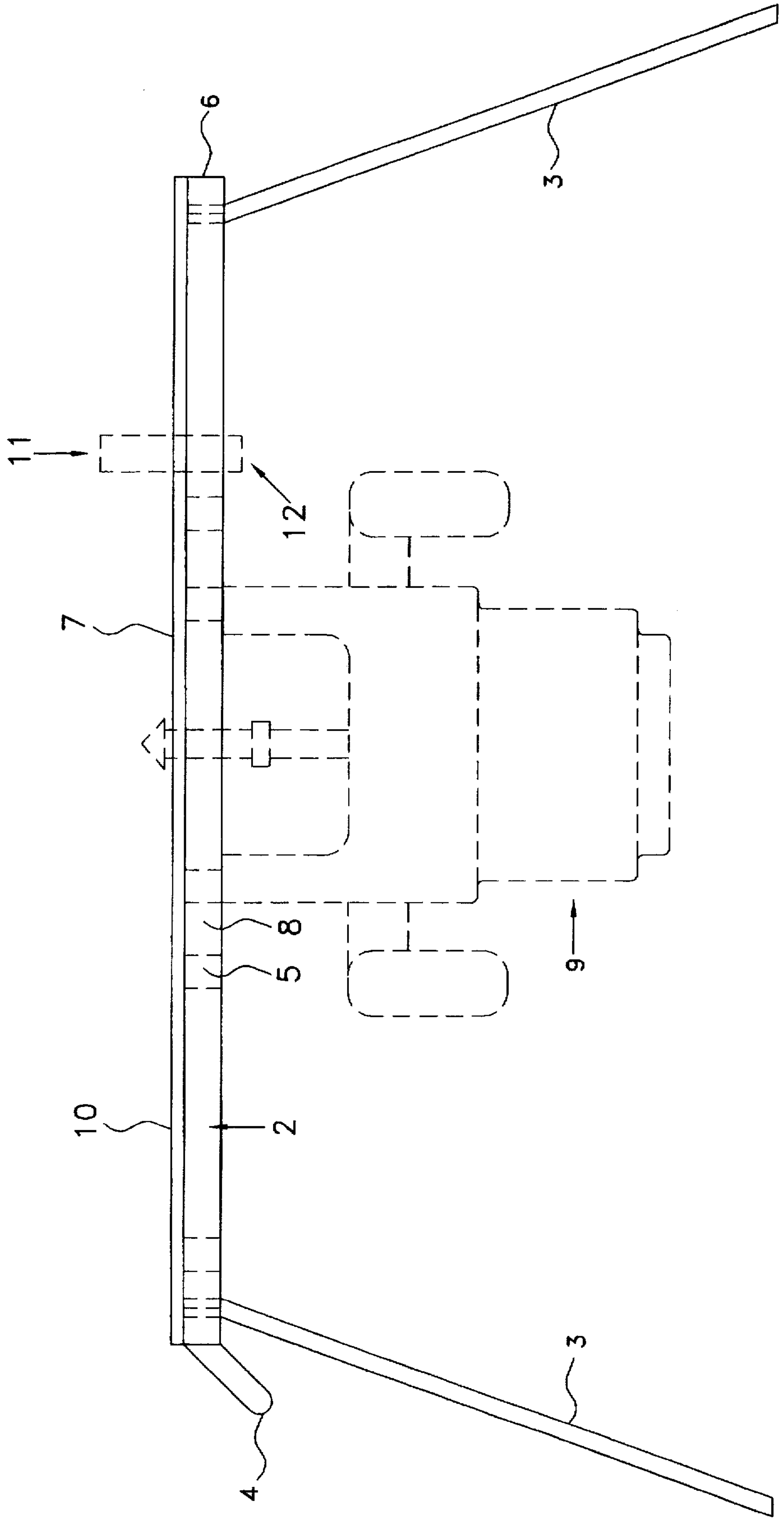
FIG. 5 is side view, showing one of the router's optional placements on the carriage invention.

As shown in FIGS. 1,2, and 5, the carriage 1 is capable of mounting a router 9 in such a manner that the bottom of the router's 9 base is flush with the bottom surface 7 of the carriage 1. The router 9 maybe attached to the carriage 1 by any conventional means (not shown), as for example, set screws, or any other conventional means which would be obvious to one skilled in the art.

As shown in FIG. 3 there are four small openings near each corner of the carriage 1 indicating receptacle locations for optional legs 3 (see FIG. 2), in order to hold the carriage 1 in an inverted position such that it becomes a table router. (see FIGS. 2 & 5). Legs 3 as shown in FIGS. 2 and 5 are two of the four optional leg means, preferably constructed of metal.

As shown in FIGS. 1, 2, and 5 the carriage 1 is provided with an optional slide enhancing surface, that is say a plastic base 10, which improves the gliding and sliding surface of the tool accessory as a unit, and improves the sliding and guiding of a work piece when the carriage 1 is in the table router configuration as shown in FIGS. 2 & 5, and is attached on the major guide side surface 7. The preferred dimensions of cover surface 10, are ¼ of an inch in thickness, by 8 inches in width, by 24 inches in length.

Attached to the carriage 1 is 4 as shown in all figures and is the optional handle for greater leverage and guide the carriage 1 when needed. The handle is preferably made of plastic.

As shown in FIGS. 2, 3, and 5, a work piece guide fence 11 is shown attached to the guide rails 6 of the carriage 1 by means of a clamping means generally shown at 12. The work piece guide fence 11 may be freely moved anywhere along the length of guide rails 6 and there may be more than one work piece guide fences 11 used and secured along guide rails 6 in any given location and operation.

With a router mounted in any of the openings 2, with work piece guide fence 11 or fences 11 properly secured, and by gripping the router 9 or gripping the router 9 in conjunction with optional handle 4, the working router may than be used with more dexterity and in a more stable fashion (greater help in controlling torque flex and tipping) in any manner to which a portable router is conventionally used by one skilled in the art. (note that some router cutting bits have adequate guide bearings incorporated and require no work piece guide fence 11).

When optional legs 3 are secured into/onto carriage 1 and router 9 mounted in any of the openings 2 and than inverted, becomes a normal table router unit (see FIGS. 2 & 5). In table router configuration all openings 2 may simultaneously be occupied with a mounted router 9 and with or without multiplicity of work piece guide fences 11 may be used with routers 9 running simultaneously for step operations, such as required for some mouldings.

Having described my invention I claim:

1. A carriage and table unit tool accessory for use with a portable router or routers to provide a portable carriage for the use of said router or routers with more stability in portable use wherein the router or routers are infed relative to a stationary workpiece and for converting said portable router or routers for use in a router table unit wherein the workpiece is infed relative to the stationary table, said carriage and table unit tool accessory comprising:

an elongated rigid generally rectangular frame element having a bottom major guide side defining a generally planar guide surface for contact with a workpiece and a top side opposite said major guide side and opposite elongated parallel edge sides which form rails spaced sufficiently to accommodate therebetween the base of said router or routers, means defining a plurality of openings through said top side and joining said bottom major guide side surface, said openings being generally centrally spaced between said elongated parallel edge sides, said openings receiving for extension therethrough the cutting elements of said portable router or routers, attachment means adjacent each of said openings allowing the secure attachment of the base of said portable router or routers to said top side, and means in said top side defining receptacle locations for a plurality of legs having a length sufficient to suspend the carriage over a suitable surface with said portable router or routers inverted and depending therefrom thereby allowing use of the portable router or routers as a table unit.

2. A carriage and table unit tool accessory as set forth in claim 1 wherein said elongated edge sides are configured to function also as guide means for permitting attachment of one or more fences extending between said edge sides.

3. A carriage and table unit tool accessory as set forth in claim 1 wherein said openings and said attachment means are sized and shaped to accommodate differently configured bases of routers.

4. A carriage and table unit tool accessory as set forth in claim 1 wherein said rectangular frame element is constructed with hollow areas fashioned to provide sufficient strength to said unit while affording the lightest possible weight.

5. A carriage and table unit tool accessory as set forth in claim 1 wherein a handle for gripping by an operators hand is positioned on said rectangular frame element.

6. A carriage and table unit tool accessory as set forth in claim 1 wherein said bottom major guide side defining the generally planar guide surface is comprised of a plastic base to improve gliding and sliding of the unit and the workpiece.

* * * * *